Patented Dec. 9, 1947

2,432,438

UNITED STATES PATENT OFFICE 2,432,438

AMIDES AND THEIR MANUFACTURE

Alfred Ofner, Montclair, and Joseph D. Surmatis, Nutley, N. J., assignors to Hoffmann-La Roche Inc., Nutley, N. J., a corporation of New Jersey No Drawing. Application May 23, 1946, Serial No. 671,901

10 Claims. (Cl. 260—561)

Our invention relates to novel compounds of the following general formula and ammonium salts thereof and to their method of manufacture. The compounds are represented as follows:

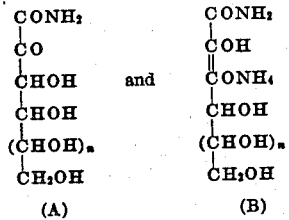

in which $n$ represents zero or a low positive integer, such as 1 or 2.

The formulae are generic in characterization, no specific stereochemical configuration being designated. The subscript $n$ may be zero or an integer, whereby the amides are amides of pentonic acids, of hexonic acids, or of heptonic acids or the like.

The amides of this invention are particularly useful as intermediates for the preparation of saccharosonic acids, such as vitamin C, and related lactones.

In general, the preparation of our novel amides involves the treatment, under anhydrous conditions, of a lower alkyl ester of an acid of the general formula:

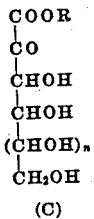

wherein $n$ has the significance given above, and wherein R represents lower alkyl, such as methyl, ethyl, propyl, isoamyl, butyl, and the like with anhydrous ammonia, preferably in the presence of an inert organic solvent for the ester. Aliphatic hydroxy compounds such as lower methanol, ethanol, butanol, or the like, are suitable.

The reaction may be carried out at various pressures, including atmospheric pressure and elevated pressures, preferably atmospheric. The temperature may be varied. Too low a temperature slows the reaction; whereas a high temperature may lead to decomposition. A range of 0–60° C. is suitable, lower temperatures in this range being preferred. In general, the reaction can be carried out under reflux conditions.

The reaction can be illustrated as follows:

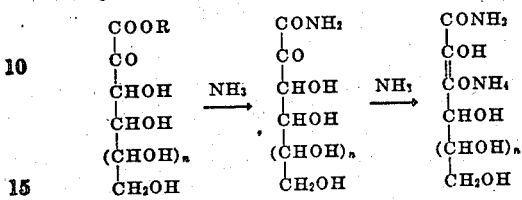

In the conversion of an ester of 2-keto-1-gulonic acid, a typical synthesis in this respect, the following reaction takes place:

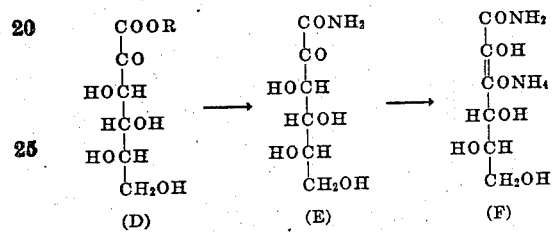

Esters of 2-keto-d-gluconic acid yield the corresponding amides of 2-keto-d-gluconic acid.

The significance of the invention will be made apparent by the following illustrative examples which will serve as a guide to those skilled in the art, to carry out the novel syntheses of our invention. The esters may be treated in isolated condition or in the nonisolated form. The latter modification is of particular value from a commercial viewpoint. The amides may be purified, or employed in their reaction mixture for further treatment, as shown in Example 2, hereinafter.

It will be appreciated that the proportion of reactants, times of reaction, temperatures of reaction, and the like, may be varied; and that supplementary processes, such as purification and the like, may be resorted to wherever found desirable or convenient. These and other variations and modifications will be evident to those skilled in the art, in the light of the guiding principles disclosed herein.

Example 1

62.5 grams of the butyl ester of 2-keto-l-gulonic acid were dissolved in 375 grams of anhydrous butyl alcohol. The solution was placed in a round-bottom flask provided with an efficient stirrer, and cooled to 10° C. by means of an ice-water bath. Anhydrous ammonia, at atmospheric pressure and at the approximate rate of 7 liters per hour, was passed through the solution for 90 minutes. The light yellow colored product which precipitated from the solution was filtered off by suction, washed in anhydrous ethyl ether and dried in a vacuum desiccator. The product was very soluble in methyl alcohol or water. It was hygroscopic and melted at 86–88° C.

The product was the amide of 2-keto-l-gulonic acid.

Example 2

The methyl ester of 2-keto-d-gluconic acid, 52 grams, was placed in 312 grams of anhydrous methyl alcohol in a one-liter round-bottom flask provided with a stirrer, condenser and a gas inlet tube extending to the bottom of the liquid. The flask was heated on a water bath until the alcohol began to reflux; then a vigorous stream of anhydrous ammonia, at atmospheric pressure, was passed into the stirred reaction mixture. In 15 minutes, all the ester was dissolved to give a yellow solution. The reaction was continued until there was no further increase in iodine consumption of a diluted and acidified sample which was pipetted out of the reaction flask. This took about 45 minutes additional. The pH of the solution at this time was 9.7. The methanol was distilled off under vacuum in order to remove the excess ammonia. The residue was redissolved in 400 cc. of methyl alcohol. Sodium hydroxide, 8 grams, was dissolved in 30 cc. of water and stirred into the alcoholic solution. On cooling overnight in the refrigerator, 39 grams of a tan colored sodium isoascorbate was obtained. In this example the amides are directly converted to isoascorbate.

Example 3

52 grams of methyl ester of 2-keto-l-gulonic acid were dissolved in 1040 grams anhydrous ethyl alcohol with stirring on a steam bath. The solution was placed in a 2-liter flask provided with an efficient stirrer and surrounded with a water-bath kept at 35° C. This temperature was necessary to keep the methyl ester from crystallizing out of the solution and contaminating the amide. A stream of anhydrous ammonia was passed into the stirred solution for 90 minutes at a rate of 7 liters per hour. The reaction mixture was then surrounded with an ice-water bath and stirred for an additional 30 minutes to force the precipitation of the amide. The solid was filtered by suction, washed in anhydrous ethyl ether, and dried in a vacuum desiccator. On cooling the filtrate in a refrigerator overnight, an additional yield of the amide was obtained. The product was the amide of 2-keto-l-gulonic acid.

Example 4

The butyl ester of 2-keto-l-gulonic acid, 62.5 grams, was dissolved in 1300 cc. of butyl alcohol and placed in a two liter round-bottom flask fitted with a mechanical stirrer and a gas inlet tube extending down to the bottom of the liquid. This was heated up to 58° C.; then a stream of anhydrous ammonia was passed into the mixture with stirring. A cloudiness began to form in the liquid immediately on contact with the ammonia. This formed curdy white particles suspended in the liquid. When the reaction had progressed for 30 minutes, the nature of the precipitate changed to a dark brown sirup which collected on the sides of the flask. The addition of the ammonia was continued for one hour while the temperature was not allowed to exceed 65° C.

Thereafter, approximately one-half of the butyl alcohol was distilled off at a reduced pressure of 20 to 25 mm. in order to remove the excess ammonia. On cooling to room temperature, the product on the sides of the flask solidified to form a brown, semitransparent solid. This was removed from the flask, washed with anhydrous ethyl ether and dried in a vacuum dessicator. The weight obtained was 38.5 grams. Analysis of the solid showed that it contained a substantial proportion of the ammonium salt of the amide of 2-keto-l-gulonic acid, as well as ammonium ascorbate.

The preparation of ascorbates and salts, e. g. ammonium ascorbate and ascorbic acid, from our novel amides, such as the amide of 2-keto-l-gulonic acid, is disclosed and claimed in our copending application (II) Serial No. 671,902, filed of even date, titled Chemical synthesis.

We claim:

1. The process of synthesizing amides of the general formula

which comprises subjecting esters of the general formula

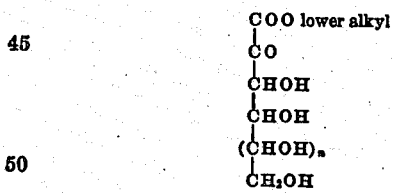

to the action of anhydrous ammonia, $n$ being a member selected from the group consisting of zero and low positive integers.

2. The process of claim 1 carried out in the presence of an inert organic solvent.

3. The process of claim 1 carried out in the presence of a lower aliphatic alcohol.

4. The process of claim 1 in which the ester is a lower alkyl ester of 2-keto-l-gulonic acid.

5. The process of claim 1 in which the ester is the methyl ester of 2-keto-l-gulonic acid.

6. The process of claim 1 in which the ester is the ethyl ester of 2-keto-l-gulonic acid.

7. The process of claim 1 in which the ester is a lower alkyl ester of 2-keto-d-gluconic acid.

8. A product of the general formula

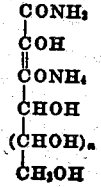

in which $n$ is a member of the group consisting of zero and positive low integers.

9. The ammonium salt of the amide of 2-keto-l-gulonic acid.

10. The ammonium salt of the amide of 2-keto-d-gluconic acid.

ALFRED OFNER.
JOSEPH D. SURMATIS.

REFERENCES CITED

The following references are of record in the file of this patent:

Haworth "Jour. of Chemistry & Industry," vol. 52 (1933), p. 484.

Ohle et al., Ber. Deut. Chem., vol. 63 (1930), pp. 847–848.

Reichstein et al., "Ubersicht uber Chemie und Biologische Wirkung der Ascorbinsauregruppe" (1936), p. 117.